(12) United States Patent
Ish et al.

(10) Patent No.: US 8,966,170 B2
(45) Date of Patent: Feb. 24, 2015

(54) ELASTIC CACHE OF REDUNDANT CACHE DATA

(75) Inventors: Mark Ish, Atlanta, GA (US); Anant Baderdinni, Lawrenceville, GA (US); Gary J. Smerdon, Saratoga, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 184 days.

(21) Appl. No.: 13/362,099

(22) Filed: Jan. 31, 2012

(65) Prior Publication Data

US 2013/0198448 A1 Aug. 1, 2013

(51) Int. Cl.
*G06F 12/08* (2006.01)

(52) U.S. Cl.
USPC ........... 711/113; 711/114; 711/118; 711/154; 711/156; 711/170; 711/E12.019; 365/205

(58) Field of Classification Search
USPC ......................... 711/113, 114, 154, 156, 170
See application file for complete search history.

(56) References Cited

U.S. PATENT DOCUMENTS

| | | | | |
|---|---|---|---|---|
| 5,526,507 A * | 6/1996 | Hill | | 711/114 |
| 5,586,291 A | 12/1996 | Lasker et al. | | 395/440 |
| 5,974,506 A | 10/1999 | Sicola et al. | | 711/120 |
| 6,128,717 A * | 10/2000 | Harrison et al. | | 711/202 |
| 6,279,078 B1 * | 8/2001 | Sicola et al. | | 711/119 |
| 6,446,188 B1 * | 9/2002 | Henderson et al. | | 711/206 |
| 6,574,709 B1 | 6/2003 | Skazinski et al. | | 711/119 |
| 6,772,288 B1 * | 8/2004 | Flake et al. | | 711/118 |
| 2004/0205092 A1 * | 10/2004 | Longo et al. | | 707/205 |
| 2008/0172531 A1 * | 7/2008 | Liu et al. | | 711/135 |
| 2009/0265507 A1 | 10/2009 | Jibbe et al. | | 711/103 |
| 2010/0037102 A1 | 2/2010 | Chen et al. | | 714/42 |
| 2010/0064205 A1 | 3/2010 | Moyer | | 714/800 |
| 2010/0106904 A1 | 4/2010 | Berke et al. | | 711/114 |
| 2010/0174863 A1 * | 7/2010 | Cooper et al. | | 711/113 |
| 2011/0231369 A1 | 9/2011 | Kawamura et al. | | 707/659 |
| 2012/0079318 A1 * | 3/2012 | Colgrove et al. | | 714/6.22 |

FOREIGN PATENT DOCUMENTS

WO WO2011/048626 A1 4/2011 ............. G06F 11/20

OTHER PUBLICATIONS

Mike Gualtieri, Elastic Caching Platforms Balance Performance, Scalability, and Fault Tolerance, Mar. 18, 2010-16:18, Forrester Blogs (http://blogs.forrester.com), pp. 1-4.*

* cited by examiner

*Primary Examiner* — Mardochee Chery
*Assistant Examiner* — Kamal K Dewan
(74) *Attorney, Agent, or Firm* — Christopher P. Maiorana, PC (57) ABSTRACT

An apparatus for elastic caching of redundant cache data. The apparatus may have a plurality of buffers and a circuit. The circuit may be configured to (i) receive a write request from a host to store write data in a storage volume, (ii) allocate a number of extents in the buffers based upon a redundant organization associated with the write request and (iii) store the write data in the number of extents, where (a) each of the number of extents is located in a different one of the buffers and (b) the number of extents are dynamically linked together in response to the write request.

20 Claims, 11 Drawing Sheets

ELASTIC CACHE OF REDUNDANT CACHE DATA

FIELD OF THE INVENTION

The present invention relates to storage device caching generally and, more particularly, to a method and/or apparatus for implementing an elastic cache of redundant cache data.

BACKGROUND OF THE INVENTION

In conventional storage systems, overall system and application performance is improved by caching data that is frequently accessed. In many applications, workloads benefit from and performance is improved if the cache uses a write-back mode. Cache data held in the write-back mode is sometimes protected against data loss by providing redundancy. The redundancy is commonly implemented with two Flash modules in a cache controller. Both Flash modules are permanently paired using mirroring, effectively reducing the available space to hold the cache data to a single Flash module. Given that only some host data benefits from the redundancy, inefficient use is made of the available space in the Flash modules.

It would be desirable to implement an elastic cache of redundant cache data.

SUMMARY OF THE INVENTION

The present invention concerns an apparatus for elastic caching of redundant cache data. The apparatus may have a plurality of buffers and a circuit. The circuit may be configured to (i) receive a write request from a host to store write data in a storage volume, (ii) allocate a number of extents in the buffers based upon a redundant organization associated with the write request and (iii) store the write data in the number of extents, where (a) each of the number of extents is located in a different one of the buffers and (b) the number of extents are dynamically linked together in response to the write request.

The objects, features and advantages of the present invention include providing a method and/or apparatus for implementing an elastic cache of redundant cache data that may (i) provide additional effective cache space, (ii) provide better cache coverage for a given amount of cache media compared with common techniques, (iii) use an existing extent structure, (iv) use an existing management infrastructure, (v) implement a variety of RAID levels for the cache redundancy, (vi) reduce the number of buffer writes for a given amount of host input/output activity compared with common techniques, (vii) enhance the life of Flash memory buffers for the given host input/output activity and/or (viii) implement solid state drivers as large buffers for the cache data.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Some embodiments of the present invention may use available cache space elastically to provide redundancy to write portions of the cache space. The elastic manner is generally implemented with an intelligent management technique that increases an overall usable portion of the cache space to buffer read data and/or unprotected (e.g., non-redundant) write data. Furthermore, the elastic approach may be modeled to show other benefits, such as aggregation (e.g., some data may be mirrored on separate physical devices on a per extent basis such that if storage and the cache are shared across multiple nodes (servers), each part of the mirrored extents may reside of separate nodes) and policy selection (e.g., some storage disks utilize protected (or redundant) cache data and some do not protect the cache data based on a chosen policy).

Figure 1:
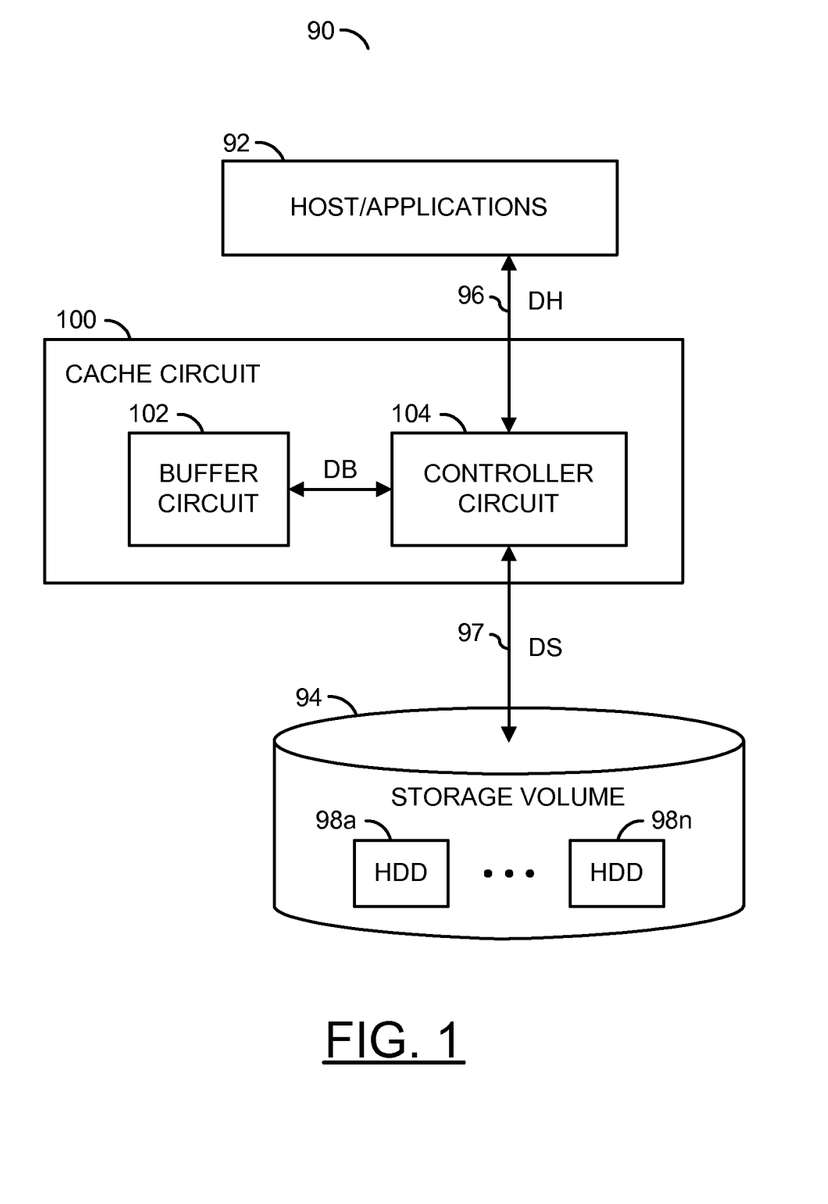
FIG. 1 is a block diagram of an example implementation of a system.

Referring to FIG. 1, a block diagram of an example implementation of a system 90 is shown. The system (or apparatus) 90 generally comprises a block (or circuit) 92, a block (or circuit) 94, a network (or bus) 96, a network (or bus) 97 and a block (or circuit) 100. The circuit 94 generally comprises multiple blocks (or circuits) 98a-98n. The circuit 100 generally comprises a block (or circuit) 102 and a block (or circuit) 104. The circuits 92-104 may represent modules and/or blocks that may be implemented as hardware, software, a combination of hardware and software, or other implementations.

A bidirectional signal (e.g., DH) may be exchanged between the circuit 92 and the circuit 100 via the network 96. The signal DH may be used to communicate data (e.g., read data and/or write data), requests and status information between the circuit 92 and the circuit 100. A bidirectional signal (e.g., DB) may be exchanged between the circuit 102 and the circuit 104. The signal DB may convey cache data and metadata between the circuit 102 and the circuit 104. A bidirectional signal (e.g., DS) may be exchanged between the circuits 94 and the circuit 100 via the network 97. The signal DS may transfer data and associated commands (e.g., read commands, write command and configuration commands) between the circuit 100 and the circuit 94.

The circuit 92 may implement one or more host circuits (or servers) and/or one or more software applications. The circuit 92 is generally operational to read and/or write data to and from the circuit 94 via the circuit 100 and the network 96 in the signals DH and DS. The circuit 92 may also be operational to present requests (e.g., read requests and write requests) along with corresponding address information (e.g., logical block addresses (LBAs)) to the circuit 100 in the signal DH. Furthermore, the circuit 92 may be operational to present commands (e.g., pre-fetch, flush, configure, etc.) in the signal DH to the circuit 100. The signal DH may also be controlled by the circuit 100 to convey status information (e.g., cache hit, cache miss, etc.) from the circuit 100 back to the circuit 92.

The circuit 94 may implement one or more storage volumes. The circuit 94 is generally operational to store data received from the circuit 100 via the signal DS in response to write commands. The circuit 94 may also be operational to present data to the circuit 100 via the signal DS in response to read commands. The storage volumes may be implemented as logical volumes, virtual volumes and/or physical volumes. The circuit 94 may be part of a storage area network (SAN), network attached storage (NAS) and/or disk array subsystem (DAS) architecture.

The network 96 may implement one or more digital communications network and/or busses. The network 96 is generally operational to provide communications between the circuit 92 and the circuit 100. Implementations of the network 96 may include, but are not limited to, one or more of the Internet, Ethernet, fibre optical networks, wireless networks, wired networks, radio frequency communications networks and/or backplane busses.

The network 97 may implement one or more digital communications network and/or busses. The network 97 is generally operational to provide communications between the circuit 94 and the circuit 100. Implementations of the network 97 may include, but are not limited to, one or more of the Internet, Ethernet, fibre optical networks, wireless networks, wired networks, radio frequency communications networks and/or backplane busses.

Each circuit 98a-98n may implement a mass storage drive. In some embodiments, each circuit 98a-98n may implement a hard disk drive (e.g., HDD). The circuits 98a-98n are generally operational to store and present the data to and from the circuit 100 via the signal DS. The circuits 98a-98n may be arranged and operated as one or more storage volumes. In some embodiments, the circuits 98a-98n may be organized and operated as one or more redundant and independent disks (e.g., RAID) configurations. The RAID organizations may include, but are not limited to, RAID 0, RAID 1, RAID 2, RAID 3, RAID 4, RAID 5, RAID 6, RAID 7, RAID 10, RAID 53 and/or RAID 0+1 organizations. Other levels of RAID organization may be implemented to meet the criteria of a particular application. Furthermore, multiple different RAID organizations may be represented simultaneously by the circuits 98a-98n.

The circuit 100 may implement a cache circuit. The circuit 100 is generally operational to cache data being exchanged between the circuit 92 and the circuit 94. The caching may implement a write-back (or write-behind) policy for write data being moved from the circuit 92 to the circuit 94. The dirty write data may be buffered with the circuit 100 using a redundant organization spread among multiple media. The redundant organization and spreading may be configured such that access to the dirty write data is maintained after a failure of a single medium causes part or all of the write data in the failed medium to become inaccessible and/or lost. The circuit 100 may implement a cache located in circuit 92, the circuit 94 or at an intermediate point. In some embodiments, the circuit 100 may be implemented as one or more integrated circuits.

The circuit 102 may implement multiple buffer circuits. The circuit 102 may be operational to store cache (or buffered) data being transferred between the circuit 92 and the circuit 94. The circuit 102 may also be operational to store the metadata associated with the cache data. The cache data may be arranged in extents. Each extent may represent a continuous block of storage space reserved for a particular data file or software program. The metadata generally comprises information used to manage the extents. In some embodiments, the circuit 102 may be implemented completely internal to the circuit 100 (as shown), completely external to the circuit 100, partially internal and external to the circuit 100 or aggregated across multiple nodes (or servers).

The circuit 104 may implement a controller device. The circuit 104 may be operational to receive a write request from the circuit 92 to store write data in the circuit 94, allocate a number of extents in a plurality of buffers in the circuit 102 based upon a redundant organization associated with the write request and store the write data in the number of extents. Each extent of the number of extents is generally located in a different buffer. The number of extents may be dynamically linked together in response to the write request. The circuit 104 may be further operational to unlink at least one of the number of extents in response to copying the write data from the buffers to the circuit 94. In some embodiments, the circuit 104 may be implemented as one or more integrated circuits.

Figure 2:
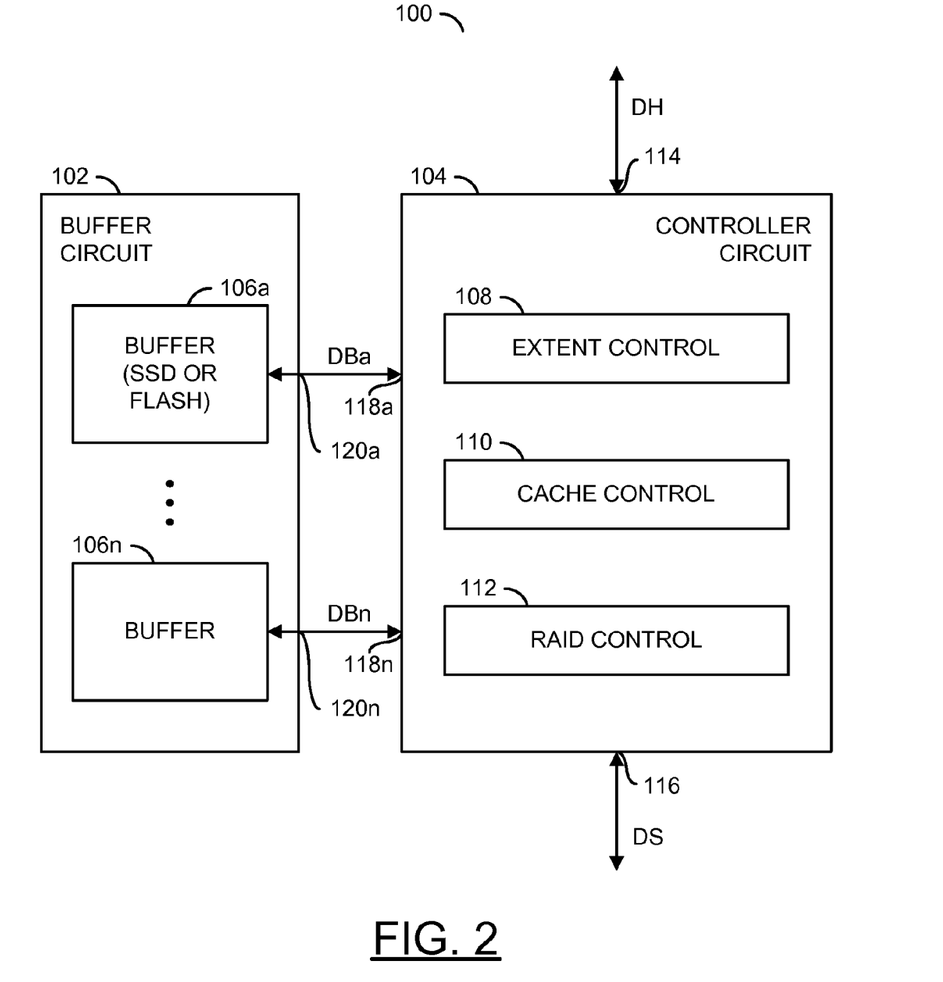
FIG. 2 is a block diagram of an example implementation of a cache circuit in the system in accordance with a preferred embodiment of the present invention.

Referring to FIG. 2, a block diagram of an example implementation of the circuit 100 is shown in accordance with a preferred embodiment of the present invention. The circuit 102 generally comprises multiple blocks (or circuits) 106a-106n. The circuit 104 generally comprises a block (or module) 108, a block (or module) 110 and a block (or module) 112. The circuits 106a-106n may represent modules and/or blocks that may be implemented as hardware, software, a combination of hardware and software, or other implementations. The modules 108-112 may be implemented as firmware (or software, or program instructions, or code) that may be executed to control the circuit 104.

The signal DH may be sent and received by the circuit 104 through an interface 114. The signal DS may be sent and received by the circuit 104 through an interface 116. The signal DB may be implemented as multiple signals (e.g., DBa-DBn). Each signal DBa-DBn generally establishes communications between interfaces 118a-118n of the circuit 104 and corresponding interfaces 120a-120n of circuits 106a-106n.

Each circuit 106a-106n may implement a buffer circuit. Each circuit 106a-106n may be operational to store the cache data and the associated metadata. In some embodiments, each circuit 106a-106n may be implemented as a solid state drive (e.g., SSD). Common sizes of a solid state drive may range from 1 to 2 terabytes. In other embodiments, each circuit 106a-106n may be implemented as a Flash drive. Common sizes of a Flash memory may range from 1 to 32 gigabytes. In still other embodiments, each circuit 106a-106n may be implemented as a double data rate (e.g., DDR) memory circuit. Common sizes of a DDR memory may range from 1 to 64 gigabytes. Other sizes may be implemented to meet the criteria of a particular application. The number of circuits 106a-106n in the circuit 102 may be more than, the same as, or fewer than the number of circuits 98a-98n in the circuit 94.

The module 108 may implement an extent controller. The module 108 may be operational to allocate and deallocate one or more extents in the circuit 102 to service requests (e.g., read requests and/or write requests) received from the circuit 92. The module 108 may also be operational to change parameters in the metadata associated with each extent in the circuit 102 to create grouped spaces (e.g., read spaces and/or write spaces). The grouping may be achieved by linking the extents together to form larger memory spaces (or super extents) that may accommodate the cache data in the redundancy-protected organizations. The allocation (or linking) of the extents into a grouped space generally involves changing each parameter of the associated extents to point to a next extent in the group. The pointing may continue in a chain from one or more initial extents to one or more final extents. The parameters of the final extents may point back to the initial extents to close the link. The module 108 may also change the parameters in the metadata to dissolve the grouped spaces back into individual extents and/or smaller grouped spaces. In situations where the cache data is buffered in a non-redundant organization, the module 108 may change the parameters of one or more extents to an allocated (or null) value to indicate that the extents are currently being used to buffer cache data. When an extent is no longer being used to buffer cache data, the module 108 may change the associated parameter to an unallocated (or unused) value.

The module 110 may implement a cache controller. The module 110 may be operational to perform standard caching operations and standard cache policies. The caching operations generally include, but are not limited to, writing data into the circuit 102, reading the cache (or buffered) data from the circuit 102, writing the metadata into the circuit 102, reading the metadata from the circuit 102, searching for tags of the cache data, indicating a cache hit when a matching tag is found, indicating a cache miss when no matching tag is found, tracking dirty write data in the circuit 102, flushing (e.g., copying) the dirty write data to the circuit 94, tracking valid and invalid cache lines, tracking valid and invalid cache words, and the like. The module 110 may also be operational to implement one or more cache policies regarding the retention and removal of the cache data. The cache policies may include, but are not limited to, a write-back mode for dirty write data, a write-through mode for some types of write data, redundant (or protected) buffering of some types of write data, non-redundant (or non-protected) buffering of other types of write data, one or more flush policies for dirty write data, one or more removal policies to clear space within the circuit 102, and the like.

The module 112 may implement a RAID controller. The module 112 is generally operational to organize (or arrange or format) the data buffered in the circuit 102 and stored in the circuit 94 in various RAID configurations based on RAID policies assigned to the data.

When write data is received from the circuit 92 that should be protected, the module 112 may rearrange the write data into a given organization among the RAID organizations. The rearranged write data may be subsequently stored in two or more of the circuits 106a-106n based on the size of the write data (e.g., how many extent boundaries are crossed by the write data) and the RAID organization (e.g., RAID 0, RAID 3, RAID 5, etc.) corresponding to the write request. Other forms of data protection may be implemented to meet the criteria of a particular application.

When protected cache data is to be presented from the circuit 102 to the circuit 92, the module 112 may be operational to check the data for error and correct the errors if appropriate. If the data has been striped, the module 112 may also collect the stipes back into the corresponding blocks before the requested data is presented to the circuit 92.

Transfers of RAID protected write data from the circuit 102 to the circuit 94 may be performed while maintaining the data in the RAID organization. For example, if the data is in a mirrored RAID 1 organization, the data may be transferred from two circuits 106a-106n (e.g., 106a and 106b) to the corresponding two circuits 98a-98n (e.g., 98f and 98g) via the signals DB and DS. In another example, if the data is in a RAID 3 organization utilizing a parity extent with two stripe extents, the data may be transferred from the three circuits 106a-106n (e.g., 106a, 106b and 106c) to the corresponding three circuits 98a-98n (e.g., 98d, 98g and 98k) via the network 97.

Transfers of some RAID protected stored data (e.g., read data) from the circuit 94 to the circuit 102 may be performed in the RAID organization from the circuit 94 to the module 112 and in a non-redundant organization from the module 112 to the circuit 102. For example, data stored in a RAID 3 configuration may be copied from the circuit 94 to the module 112 as three parallel transfers (e.g., two extents and a parity extent). The module 112 may perform error checking and error correction as normal and transfer a single non-redundant copy of the stored data to the circuit 102.

Figure 3:
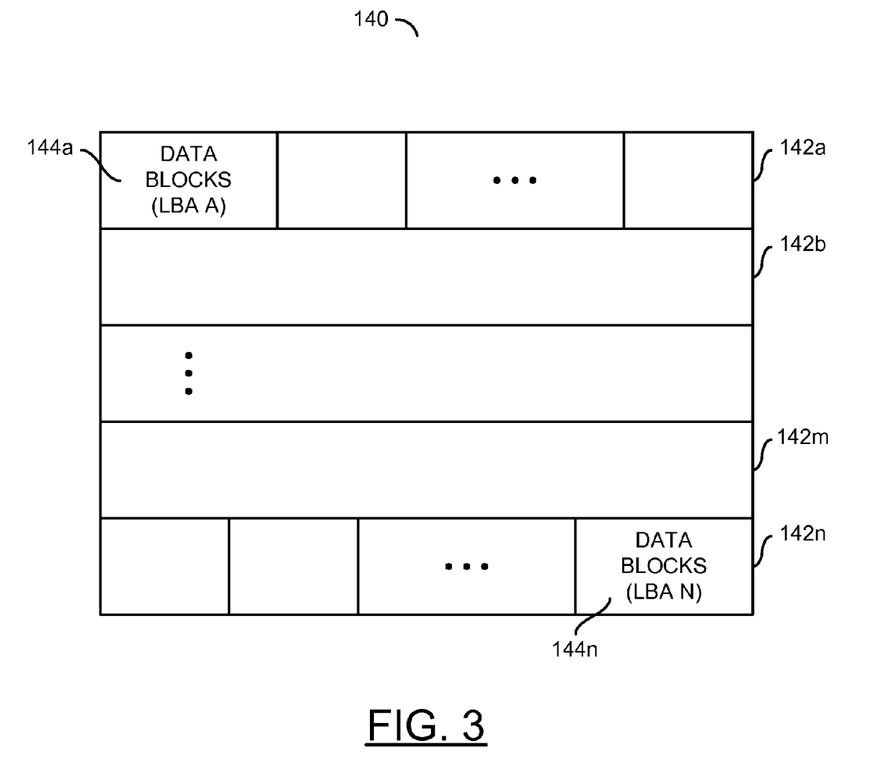
FIG. 3 is a diagram of an example structure of an extent.

Referring to FIG. 3, a diagram of an example structure of an extent 140 is shown. The cache data in the circuit 102 and the stored data in the circuit 94 may be organized in the form of extents (or widows). Each extent generally represents a collection of sequential blocks of data, treated as a single unit for allocating, deallocating, tracking and managing the data. The example extent 140 generally comprises multiple lines 142a-142n of data. Each line 142a-142n may comprise multiple data blocks 144a-144n. Each data block 144a-144n generally comprises multiple bytes, words or other units of data. Furthermore, each data block 144a-144n may have a corresponding logical block address (e.g., LBA A-LBA N). Other organizations of the extents may be implemented to meet the criteria of a particular application.

Figure 4:
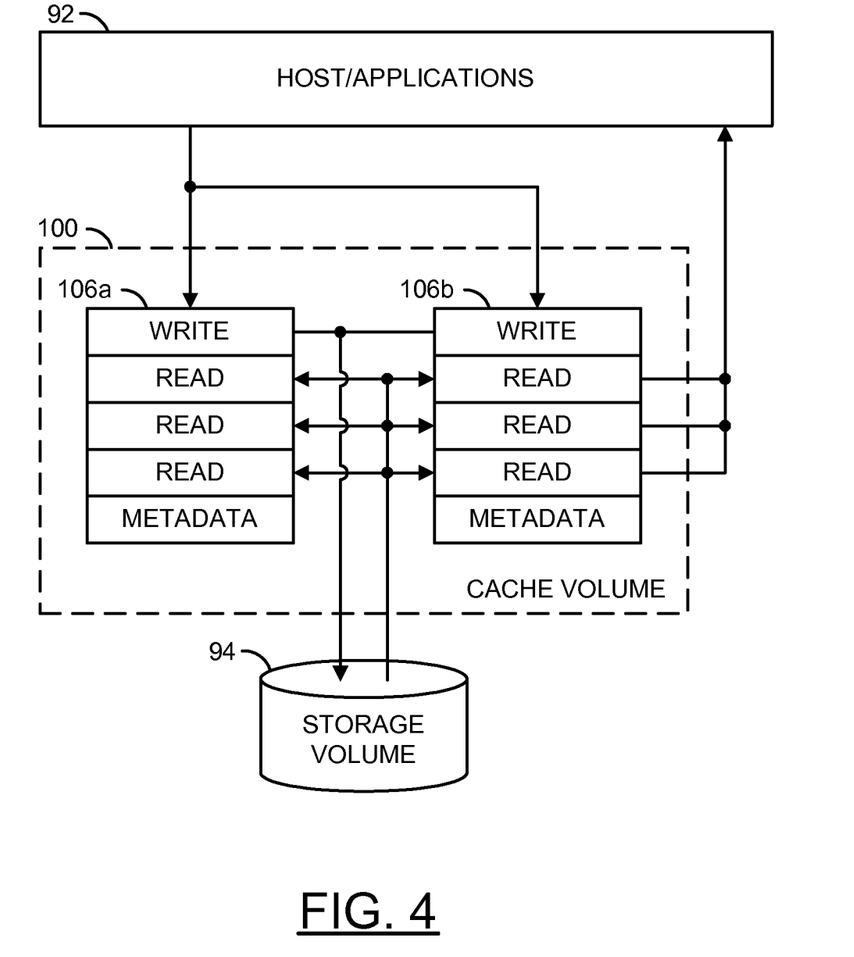
FIG. 4 is a diagram of example cache data.

Referring to FIG. 4, a diagram of example cache data is shown. The example illustrates a RAID 1 organization for redundancy. For simplicity, only two of the circuits 106a-106n (e.g., 106a-106b) are shown. Each circuit 106a-106b may be organized as one or more extents and corresponding metadata. Some extents (e.g., the WRITE extents) may carry dirty write data that has not been committed to the circuit 94. Other extents (e.g., the READ extents) may carry cache data from the circuit 94 based on some underlying caching criteria. The write extents that carry dirty write data may be buffered using redundancy protection in case a circuit 106a or 106b fails. All other extents that carry cache reads may be buffered without redundancy protection because the cache data lost in a failure of a circuit 106a or 106b may be repopulated from the circuit 94 to the working circuit 106a or 106b after the failure.

Figure 5:
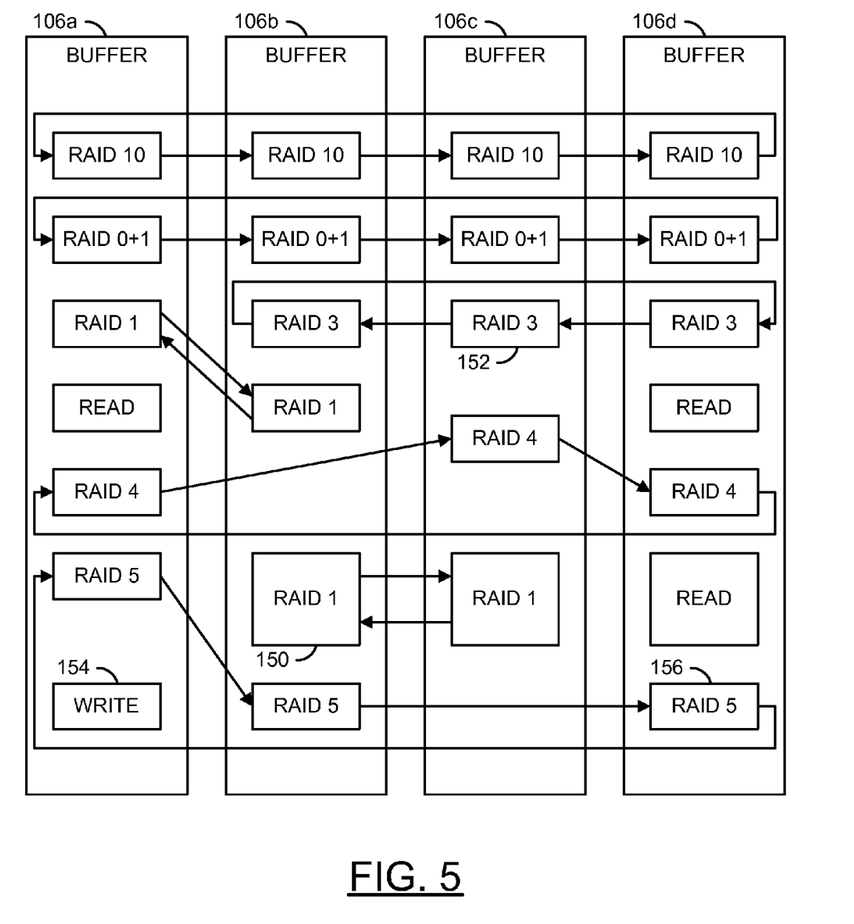
FIG. 5 is a diagram of several example groups of the extents.

Referring to FIG. 5, a diagram of several example groups of the extents within the circuit 102 is shown. In the illustrated examples, the circuit 102 may include the circuits 106a-106d. Fewer or more circuits 106a-106n may be implemented to meet the criteria of a particular application. As shown, multiple groups of extents, multiple types of groups (e.g., RAID 1, RAID, 3, RAID 4, RAID 5, RAID 10, RAID 0+1, etc.) and/or multiple ungrouped extents (e.g., READ and WRITE extents) may exist simultaneously in the circuit 102.

Each extent and the corresponding metadata may be managed using existing methods (or techniques). In particular, each extent may have a unique extent identification number used for tracking and identifying the extents. For every host input/output request, the LEAS may be mapped to the extents to locate the correct extent in order to service the host requests. A parameter (or field) may be added to the metadata of each extent to track the identification number of another extent used for redundant protection.

When write data within a single extent is received by the circuit 100 from the circuit 92, two or more extents may be allocated to a group. The corresponding parameters may be updated to point (or link) to each other in a loop. Allocation of the extents to the groups may be arranged such that each extent in a single group is located in a different circuit 106a-106n.

In some embodiments where the write data spans multiple extents and/or crosses extent boundaries, sets of two or more extents may be treated as large extents. Two or more of the large extents may be allocated to a group and the corresponding parameters may be updated to point to each other in a loop. Each set of the large extents may be located in a different circuit 106a-106n. For example, a RAID 1 group 150 generally comprises a set of two extents in the circuit 106b and another set of two extents in the circuit 106c. Each parameter of the two extents in the circuit 106b may point to a corresponding extent in the circuit 106c. Likewise, each parameter of the two extents in the circuit 106c may point to the corresponding extent in the circuit 106b.

In other embodiments where the write data spans multiple extents and/or crosses an extent boundary, adjoining extents may be located in different circuits 106a-106n and linked per the redundant organization. For example, data in a RAID 3 group 152 may have an initial extent buffered in the circuit 106b, the next extent buffered in the circuit 106c and the parity extent buffered in the circuit 106d.

Based on the cache policy, some write data may be buffered in the circuit 102 in a non-redundant organization 154. Such unprotected write data may be replaceable by the circuit 92 in the event of a data loss due to a failure in the circuit 102. The unprotected write data may also have a low importance that accommodates the potential data loss.

For each cache fill operation performed because of a read miss, a set of one or more extents may be allocated to one or more of the circuits 106a-106n, depending upon the location and amount of data to be populated in the circuit 102. Each parameter in the allocated set may be changed (or programmed) to a value (e.g., a null value or allocated value) that indicates that the corresponding extent is allocated in a non-redundant organization.

After the dirty write data in a group of extents is flushed to the circuit 94, an extent of the group may be unallocated to make space available for further allocation. An extent may be unallocated by updating the parameter of a neighboring extent to unlink the unallocated extent from the group. The unallocated extent may be determined by the redundant organization used to protect the write data. For example, a group of extents having a RAID 1 organization may deallocate either of the mirrored extents since both mirrored extents contain all of the write data. A group of extents having a RAID 3 organization may unlink the extent assigned to buffer the parity data. The remaining extents buffering the actual data may be retained in the group.

When a circuit 106a-106n fails, standard recovery techniques may be used for servicing host requests from the surviving extents. For example, a group of extents 156 having a RAID 5 organization that loses a block in a failed circuit 106a-106n (e.g., circuit 106a) may use the surviving blocks and a parity block in the surviving circuits 106a-106n (e.g., 106b and 106d) to reconstruct the lost block. The reconstructed block may subsequently be used to fulfill a read/write request.

Figure 6:
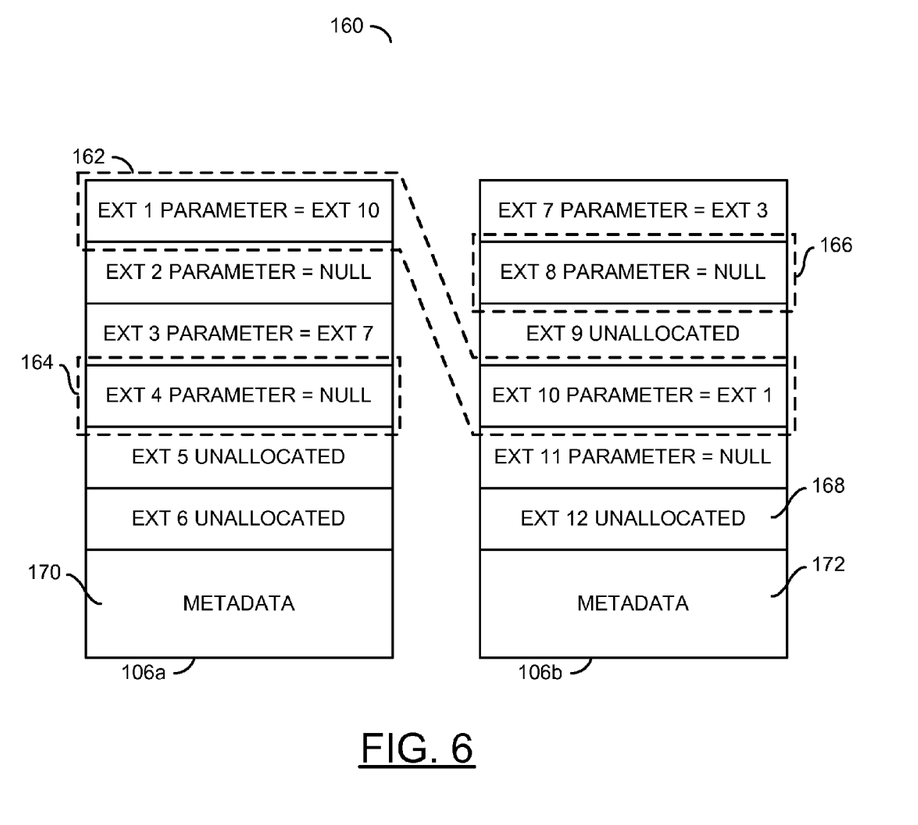
FIG. 6 is a diagram of an example cache organization with an elastic mirrored cache.

Referring to FIG. 6, a diagram of an example cache organization 160 with an elastic mirrored cache is shown. The example generally illustrates a mirrored organization using two circuits 106a-106n (e.g., 106a and 106b). Both the extent 1 and the extent 10 may be allocated to a common redundant write space 162. The allocations may be achieved by changing (i) the parameter associated with the extent 1 to point to the identification number of the extent 10 and (ii) the parameter associated with the extent 10 to point to the identification number of the extent 1. An extent 4 buffered in the circuit 106a may be allocated to a read space 164 by changing the associated parameter to the null (or allocated) value. Another extent 8, buffered in the circuit 106b, may be allocated to another read space 166 by updating the associated parameter to the null (or allocated) value. Other extents (e.g., extent 12 at reference number 168) may be unpopulated with data and thus the corresponding parameters may be set to the unallocated (or not used) value. The metadata for the extents located in the circuit 106a (e.g., extents 1-6) may be buffered in a metadata space 170. The metadata for the extents located in the circuit 106b (e.g., extents 7-12) may be buffered in a metadata space 172.

Figure 7:
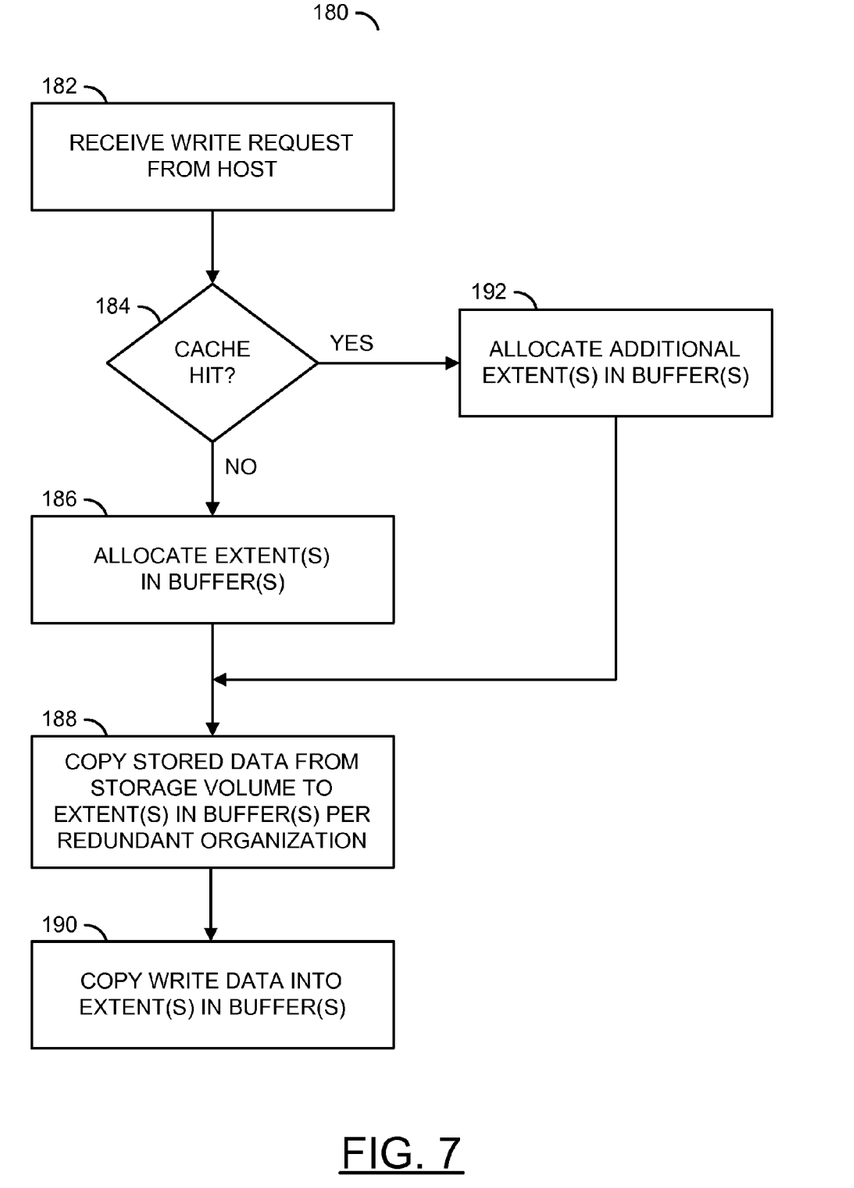
FIG. 7 is a flow diagram of an example method for servicing a write request.

Referring to FIG. 7, a flow diagram of an example method 180 for servicing a write request is shown. The method (or process) 180 may be implemented in the circuit 100. The method 180 generally comprises a step (or state) 182, a step (or state) 184, a step (or state) 186, a step (or state) 188, a step (or state) 190 and a step (or state) 192. The steps 182-192 may represent modules and/or blocks that may be implemented as hardware, software, combination of hardware and software, or other implementations.

In the step 182, the circuit 104 may receive a write request from the circuit 92 via the signal DH. A search of the cache data buffered in the circuit 102 may be performed in the step 184 by the circuit 104 (e.g., module 110) to decide if the appropriate extents for the write data are already in the circuit 102. If the appropriate extents are not available in the circuit 102 (e.g., a cache miss), the circuit 104 (e.g., module 108) may allocate unused extents in the circuit 102 to the circuits 106a-106n to service the write request in the step 186.

Once a group of extents is available to service the write request, the module 110 may copy the stored data corresponding to the write extent from the circuit 94 in the step 188. If the stored data received from the circuit 94 is not already in a protected organization (or format), the circuit 104 (e.g., the module 112) may arrange the data into a protected organization as part of the step 188. The data may be subsequently buffered into the appropriate circuits 106a-106n in the step 188 by the module 110. In the step 190, the modules 110 and 112 may organize the write data received from the circuit 92 per the protected organization and store the write data in the circuit 102. Since the write data has not yet been copied back to the circuit 94 (e.g., a write-back policy), the module 110 may update the corresponding metadata to mark the newly written data as dirty.

If the write data was found in the circuit 102 (e.g., a cache hit), the module 108 may allocate and link an additional extent to the existing one or more extents that resulted in the cache hit. Thereafter, the group of extents may be populated from the circuit 94 in the step 188 the same way as if a cache miss had occurred. The new write data may be added to the circuits 106a-106n in the step 190 by the module 110.

Figure 8:
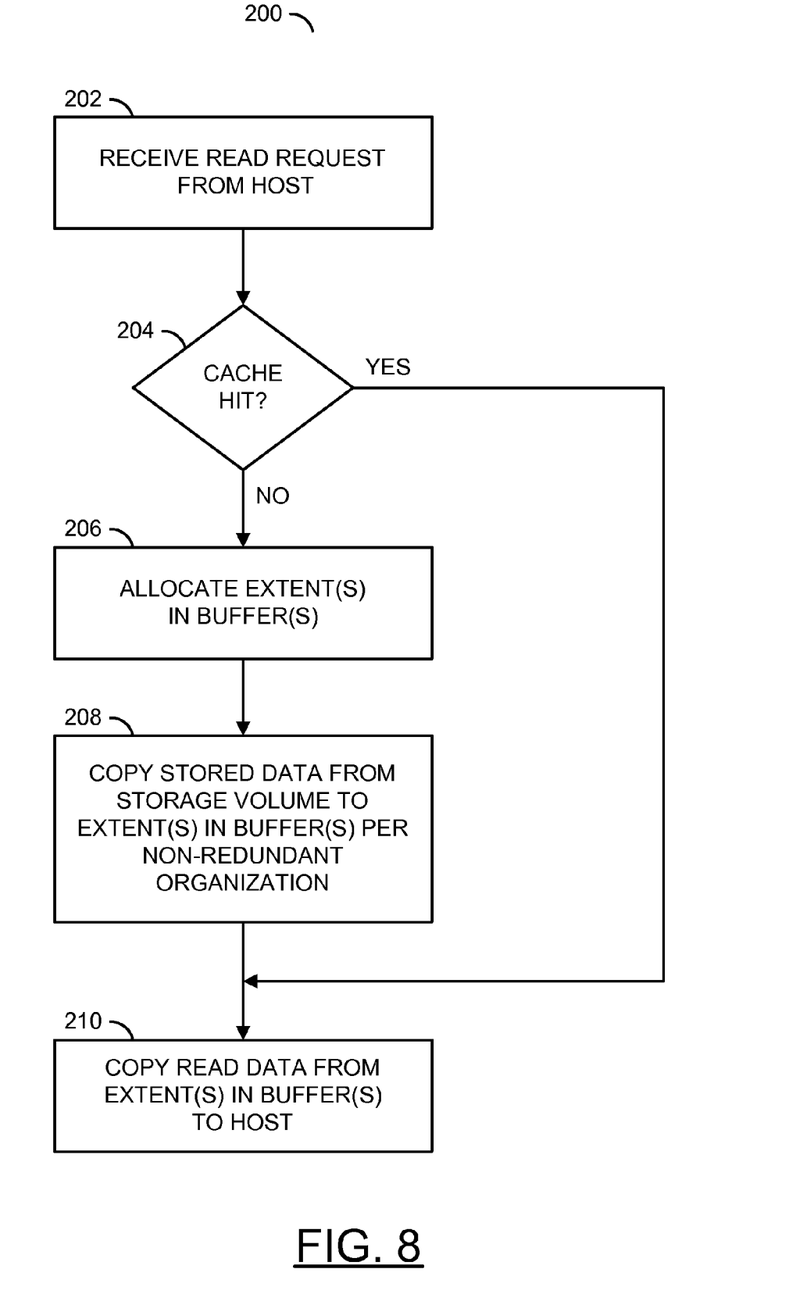
FIG. 8 is a flow diagram of an example method for servicing a read request.

Referring to FIG. 8, a flow diagram of an example method 200 for servicing a read request is shown. The method (or process) 200 may be implemented in the circuit 100. The method 200 generally comprises a state (or step) 202, a state (or step) 204, a state (or step) 206, a state (or step) 208 and a state (or step) 210. The steps 202-210 may represent modules and/or blocks that may be implemented as hardware, software, a combination of hardware and software, or other implementations.

In the step 202, the circuit 104 may receive a read request from the circuit 92 via the signal DH. A search of the cache data buffered in the circuit 102 may be performed in the step 204 by the circuit 104 (e.g., module 110). The search may decide if the appropriate extent(s) for the read data are already in the circuit 102. If the appropriate extents are not available in the circuit 102 (e.g., a cache miss), the circuit 104 (e.g., module 108) may allocate one or more unused extents in the circuits 106a-106n to service the read request in the step 206.

Once the allocated extents are available to service the read request, the module 110 may copy the stored data corresponding to the read extents from the circuit 94 in the step 208. The received data may be subsequently buffered into the appropriate circuits 106a-106n in the step 208 by the module 110. In the step 210, the module 110 may transfer a copy the requested read data from the extents to the circuit 92. If the read data was found in the circuit 102 in the step 204 (e.g., a cache hit), the method 200 may continue with the step 210 where circuit 104 transfers the requested read data to the circuit 92.

Figure 9:
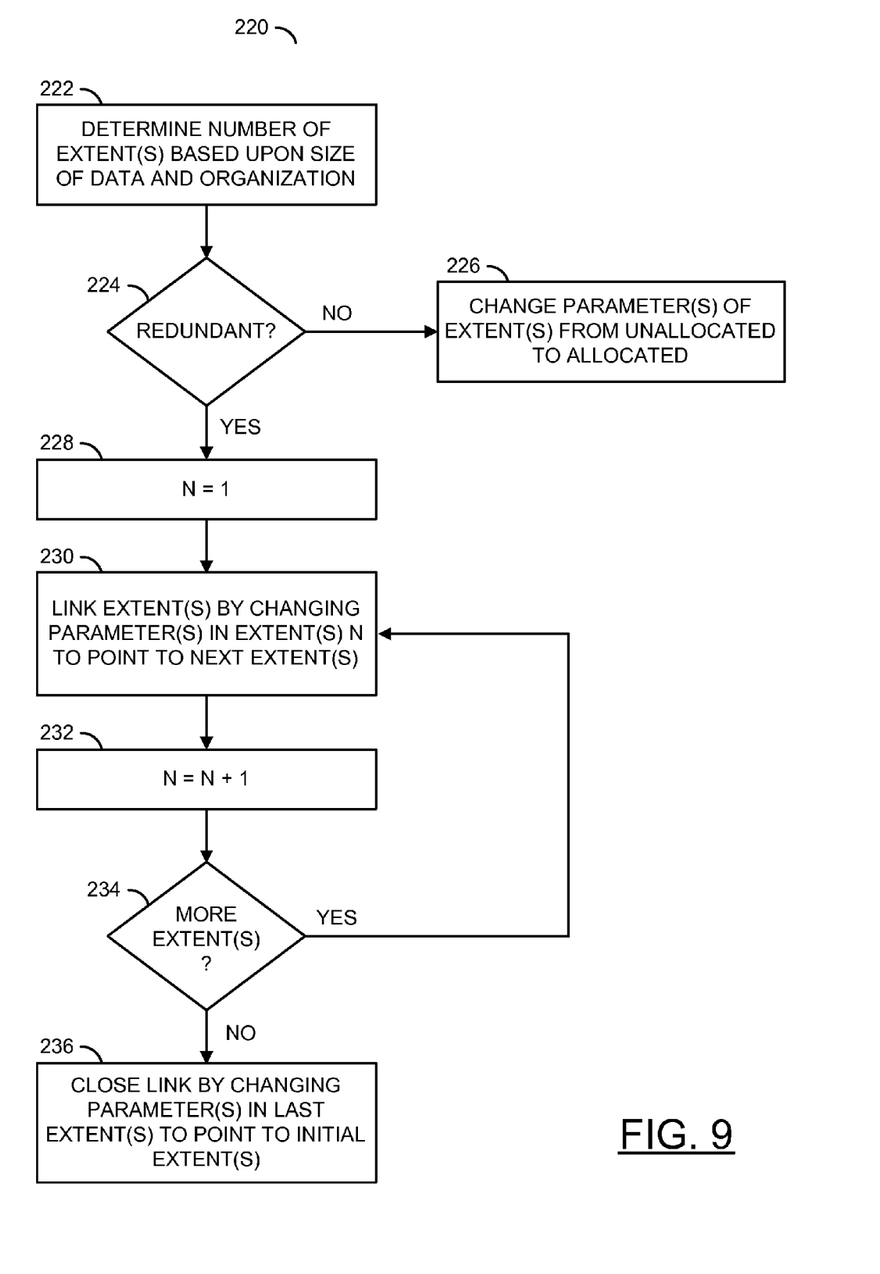
FIG. 9 is a flow diagram of an example method to allocate extents.

Referring to FIG. 9, a flow diagram of an example method 220 to allocate extents is shown. The method (or process) 220 may be implemented in the circuit 100. The method 220 generally comprises a step (or state) 222, a step (or state) 224, a step (or state) 226, a step (or state) 228, a step (or state) 230, a step (or state) 232, a step (or state) 234 and a step (or state) 236. The steps 222-236 may represent modules and/or blocks that may be implemented as hardware, software, a combination of hardware and software, or other implementations.

In the step 222, the circuit (e.g., the module 108) may determine a number of extents that should be allocated to service a request. The number of extents may be based on the amount of data being buffered and the type of organization (e.g., redundant-protected or non-redundant) to be used for the data. If the type of organization is determined to be non-redundant in the step 224, the method 220 may continue with the step 226. The circuit 104 (e.g., the module 108) may allocate one or more extents based upon a non-redundant organization associated with the read request received from circuit 92. The allocation generally involves changing the corresponding parameters of the extents from the unallocated value to the allocated (or null) value in the step 226. The resulting one or more extents (e.g., the extent 164 in FIG. 6) are generally ready to be populated with data from the circuit 94.

If the type of organization is determined to be redundant in the step 224, the method 220 may continue with the step 228. During the steps 228-236, a number of extents may be dynamically linked together by changing a respective parameter corresponding to each of the number of extents to point to another extent in the number of extents. In the step 228, the module 108 may initialize a counter (e.g., N=1). In the step 230, a corresponding parameter of an initial allocated extent may be updated (or changed) to point to a next allocated extent. The counter may be updated in the step 232 by the module 108. A check for more extents may be performed in the step 234. If more extents should be linked into the group, the module 108 may update the parameter of the next extent to point at a subsequent extent in the step 230. The looping around the step 230 to 234 may continue until all of the extents have been added to the group. In the step 236, the module 108 may close the link by updating the parameter of the last extent to point back to the initial extent. The resulting group of extents (e.g., group 162 in FIG. 6) may be ready to be populated with data.

Figure 10:
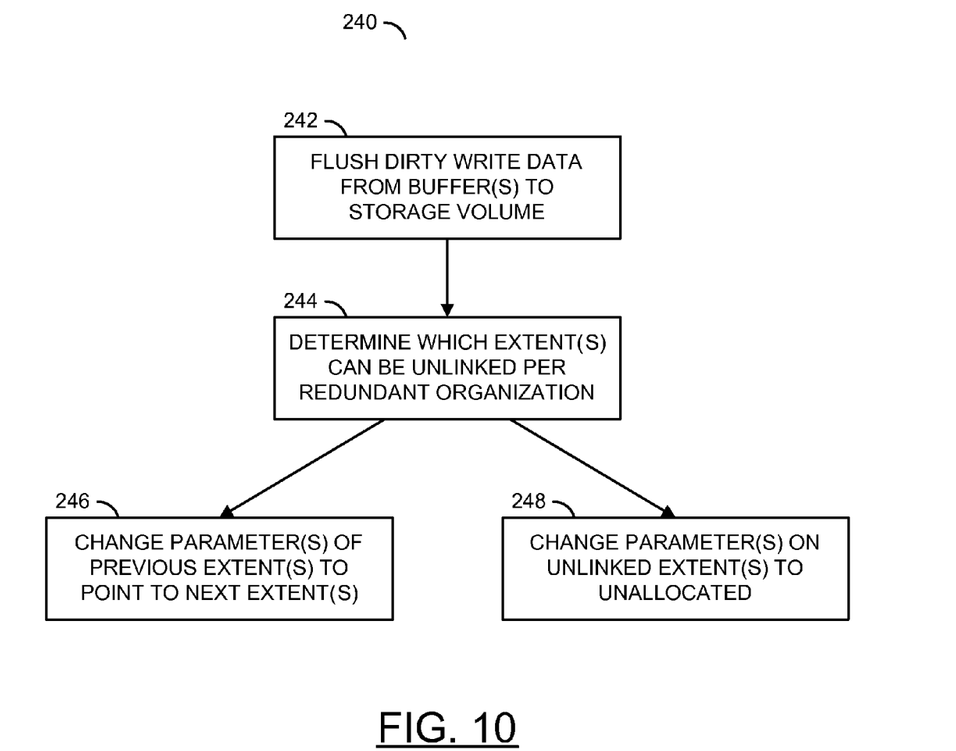
FIG. 10 is a flow diagram of an example method to deallocate extents.

Referring to FIG. 10, a flow diagram of an example method 240 to deallocate extents is shown. The method (or process) 240 may be implemented in the circuit 100. The method 220 generally comprises a step (or state) 242, a step (or state) 244, a step (or state) 246 and a step (or state) 248. The steps 242-248 may represent modules and/or blocks that may be implemented as hardware, software, a combination of hardware and software, or other implementations.

In the step 242, the circuit 104 (e.g., the module 110) may flush dirty write data from the circuit 102 to the circuit 94. In some situations, the write data may be read from the circuit 102 to the circuit 104, error corrected, restored to an original form, arranged into a RAID configuration and transferred from the circuit 104 to the circuit 94. In other situations, the dirty write data may be copied as-is from each circuit 106a-106n to a corresponding circuit 98a-98n. For example, where the extents are organized as two or more data blocks and a parity block, each data block and the parity block may be copied unchanged from the appropriate circuits 106a-106n to the corresponding circuits 98a-98n in via the signals DB and DS.

The circuit 104 (e.g., the module 108) may determine in the step 244 which of the extents may be unlinked and unallocated from the just-flushed group of extents. For example, if the write data is protected by mirroring (e.g., the RAID 1 organization), either extent may be unlinked and unallocated since both extents contain all of the write data. In another example, if the write data is protected in a RAID 4 format, the extent buffering the parity data may be unlinked and unallocated. In the step 246 the module 108 may unlink the selected extent by changing the corresponding parameters in the neighboring extent to bypass the selected extent. In the step 248, the module 108 may change the parameter of the selected extent to the unallocated value.

Figure 11:
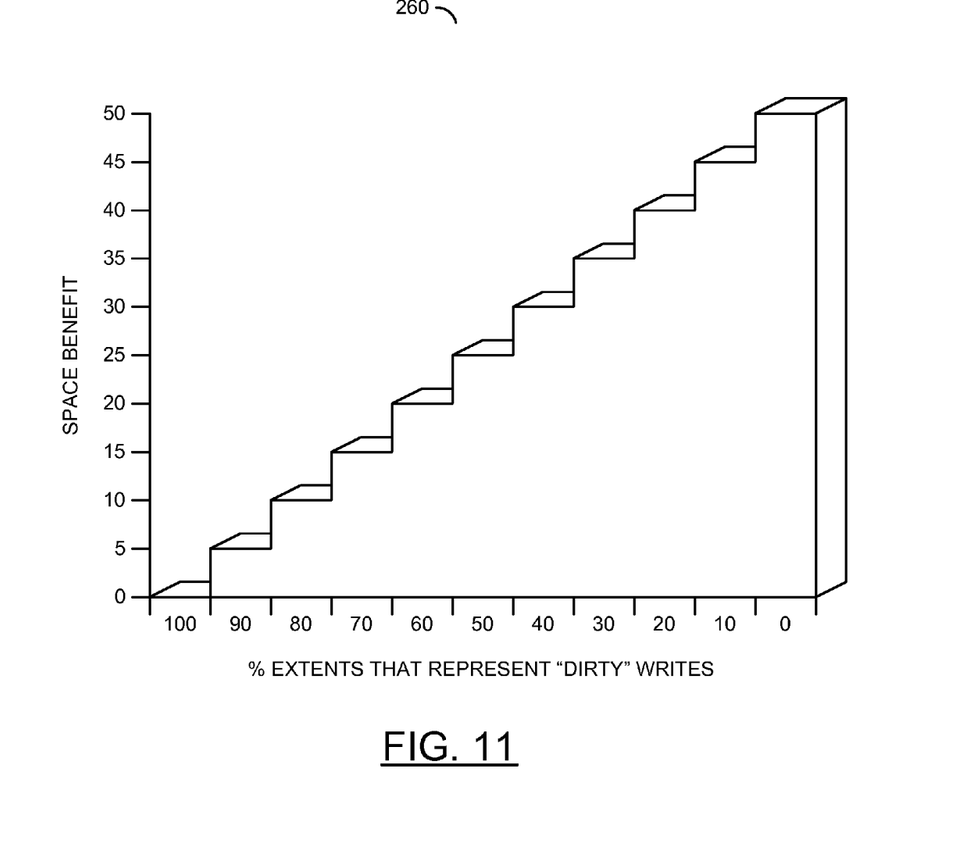
FIG. 11 is a diagram of a graph illustrating space benefits from elastically mirroring dirty writes in the cache circuit.

Referring to FIG. 11, a diagram of a graph 260 illustrating space benefits from elastically mirroring dirty writes in the circuit 102 is shown. The space benefit along the vertical axis generally indicates a percentage of the total extents that become available to buffer non-mirrored data. As illustrated in the graph 260, the space benefit may increase as fewer extents represent the write portion of data. When all of the extents are mirrored to protect the dirty write data (e.g., 100%), zero percent space savings may be realized. As a lower percentage of the extents are used to buffer the mirrored data, the space benefit dynamically (or elastically) increases. When none of the extents are used to buffer mirrored data (e.g., 0%), the 50% of the circuits 106a-106n that would normally be used to hold the mirrored data may instead be available to hold non-dirty write data and/or read data.

Depending on read/write mix of data being buffered in the circuit 100, additional cache space may be freed by the elastic grouping and ungrouping of the extents. The dynamic change in free cache space generally provides better cache coverage for a given investment in the caching media (e.g., the circuits 106a-106n). Therefore, servers (e.g., the circuit 92) with expanding frequently accessed data may take advantage of the additional available cache space.

Some embodiments of the present invention generally utilize most of the extent and metadata management infrastructure normally found in cache devices. Additional parameters to elastically allocate and unallocate extents may build on top of existing infrastructure. The techniques to create, modify and destroy groups of extents may be expanded from mirroring protection (e.g., RAID 1 level) to other RAID levels. Furthermore, the techniques generally reduce the number of writes into the circuit 102 for given amount of host input/output data since the redundancy may be limited to dirty data. Where the circuits 106a-106n are implemented with Flash memory, the reduction in the number of writes may enhance a life of the Flash media for given host input/output activity.

The functions performed by the diagrams of FIGS. 1-11 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the scope of the invention.

The invention claimed is:

1. An apparatus for elastic caching of redundant cache data, comprising:
    a plurality of buffers; and
    a circuit configured to (i) receive a write request from a host to store write data in a storage volume, (ii) select a particular redundant organization from a plurality of redundant organizations based on said write request, (iii) allocate a number of extents in said buffers based upon both a size of said write data and said particular redundant organization, and (iv) store said write data in said number of extents, wherein (a) each individual extent of said number of extents is located in a different one of said buffers, (b) said number of extents are dynamically linked together in response to said write request and (c) two or more of said links cross one or more boundaries between said buffers.

2. The apparatus according to claim 1, wherein said circuit is further configured to (i) copy a portion less than all of said write data from said buffers to said storage volume and (ii) unlink at least one and less than all of said number of extents in response to said copy of said portion of said write data.

3. The apparatus according to claim 1, wherein said number of extents are dynamically linked by changing a respective parameter corresponding to each of said number of extents.

4. The apparatus according to claim 3, wherein each of said respective parameters is changed to point to another extent in said number of extents allocated to said write data.

5. The apparatus according to claim 1, wherein said circuit is further configured to (i) select a non-redundant organization based on another request received from said host and (ii) allocate one or more extents based upon said non-redundant organization.

6. The apparatus according to claim 1, wherein (i) said circuit is further configured to allocate another number of extents based upon another redundant organization of said redundant organizations associated with another write request received from said host and (ii) said another redundant organization is different than said particular redundant organization.

7. The apparatus according to claim 1, wherein said particular redundant organization comprises an organization used with a redundance array of independent disks in said storage volume.

8. The apparatus according to claim 1, wherein said apparatus is implemented as one or more integrated circuits.

9. A method for elastic caching of redundant cache data, comprising the steps of:
    (A) receiving a write request from a host to an apparatus to store write data in a storage volume;
    (B) selecting a particular redundant organization from a plurality of redundant organizations based on said write request;
    (C) allocating a number of extents in a plurality of buffers based upon both a size of said write data and said particular redundant organization; and
    (D) storing said write data in said number of extents, wherein (i) each individual extent of said number of extents is located in a different one of said buffers, (ii) said number of extents are dynamically linked together in response to said write request and (iii) two or more of said links cross one or more boundaries between said buffers.

10. The method according to claim 9, further comprising the steps of:
   copying a portion less than all of said write data from said buffers to said storage volume; and
   unlinking at least one and less than all of said number of extents in response to said copying of said portion of said write data.

11. The method according to claim 9, wherein said number of extents are dynamically linked by changing a respective parameter corresponding to each of said number of extents.

12. The method according to claim 11, wherein each of said respective parameters is changed to point to another extent in said number of extents allocated to said write data.

13. The method according to claim 9, further comprising the steps of:
   selecting a non-redundant organization based on another request received from said host; and
   allocating one or more extents based upon said non-redundant organization.

14. The method according to claim 9, further comprising the steps of:
   allocating another number of extents based upon another redundant organization of said redundant organizations associated with another write request received from said host, wherein said another redundant organization is different than said particular redundant organization.

15. The method according to claim 9, wherein said particular redundant organization comprises an organization used with a redundance array of independent disks in said storage volume.

16. The apparatus according to claim 1, wherein said circuit is further configured to (i) receive a read request from said host and (ii) allocate one or more unused extents in response to a cache miss of said read request.

17. The apparatus according to claim 16, wherein said unused extents are allocated in a non-redundant organization.

18. The method according to claim 9, further comprising the steps of:
   receiving a read request from said host; and
   allocating one or more unused extents in response to a cache miss of said read request.

19. The method according to claim 18, wherein said unused extents are allocated in a non-redundant organization.

20. The method according to claim 9, wherein said apparatus comprises a cache circuit.

* * * * *